(12) United States Patent
Zvezdonkin

(10) Patent No.: US 10,034,467 B2
(45) Date of Patent: Jul. 31, 2018

(54) ICE FISHING STAND

(71) Applicant: Volodymyr Zvezdonkin, Pickering (CA)

(72) Inventor: Volodymyr Zvezdonkin, Pickering (CA)

( * ) Notice: Subject to any disclaimer, the term of this patent is extended or adjusted under 35 U.S.C. 154(b) by 9 days.

(21) Appl. No.: 14/849,170

(22) Filed: Sep. 9, 2015

(65) Prior Publication Data

US 2017/0064936 A1   Mar. 9, 2017

(51) Int. Cl.
| | | |
|---|---|---|
| *A01K 97/01* | (2006.01) | |
| *A01K 97/11* | (2006.01) | |
| *A01K 97/12* | (2006.01) | |
| *A01K 97/10* | (2006.01) | |
| *A01K 89/00* | (2006.01) | |
| *A01K 89/015* | (2006.01) | |

(52) U.S. Cl.
CPC .............. *A01K 97/01* (2013.01); *A01K 89/00* (2013.01); *A01K 89/01921* (2015.05); *A01K 97/10* (2013.01); *A01K 97/11* (2013.01); *A01K 97/12* (2013.01)

(58) Field of Classification Search
CPC ......... A01K 97/01; A01K 97/11; A01K 97/12
USPC .................................................. 43/15, 16, 17
See application file for complete search history.

(56) References Cited

U.S. PATENT DOCUMENTS

| | | | | |
|---|---|---|---|---|
| 2,575,156 A | * | 11/1951 | Baugh ................... | A01K 97/01 242/381 |
| 4,621,446 A | * | 11/1986 | Anderson ............. | A01K 97/01 43/17 |
| 4,651,459 A | * | 3/1987 | Wurtz ................... | A01K 97/12 43/15 |
| 5,050,333 A | * | 9/1991 | Debreczeni ........... | A01K 97/10 43/15 |
| 5,074,072 A | | 12/1991 | Serocki et al. | |
| 5,119,577 A | * | 6/1992 | Lilly .................... | A01K 97/01 43/17 |
| 5,163,243 A | * | 11/1992 | Wold, Jr. .............. | A01K 97/01 43/15 |
| 5,915,940 A | | 6/1999 | Gross et al. | |
| 8,276,310 B1 | * | 10/2012 | Weber ................... | A01K 97/10 43/17 |

FOREIGN PATENT DOCUMENTS

JP    11-334530    * 12/1999

OTHER PUBLICATIONS

"How to Change the Spool on a Spinning Reel" (uploaded May 24, 2010), https://www.youtube.com/watch?v=0evsSiyG_K0.

* cited by examiner

*Primary Examiner* — David J Parsley
(74) *Attorney, Agent, or Firm* — Millman IP Inc.

(57) ABSTRACT

According to an aspect, another ice fishing stand is disclosed and includes a base, a tip up arm, and a rod holder arm. The base is configured to be positioned about an ice-fishing hole, and has a receiving feature. The tip up arm is configured to hold a spool. The rod holder arm includes a rod holder that is configured to hold a fishing rod. The rod holder arm is releasably mountable to the receiving feature.

13 Claims, 21 Drawing Sheets

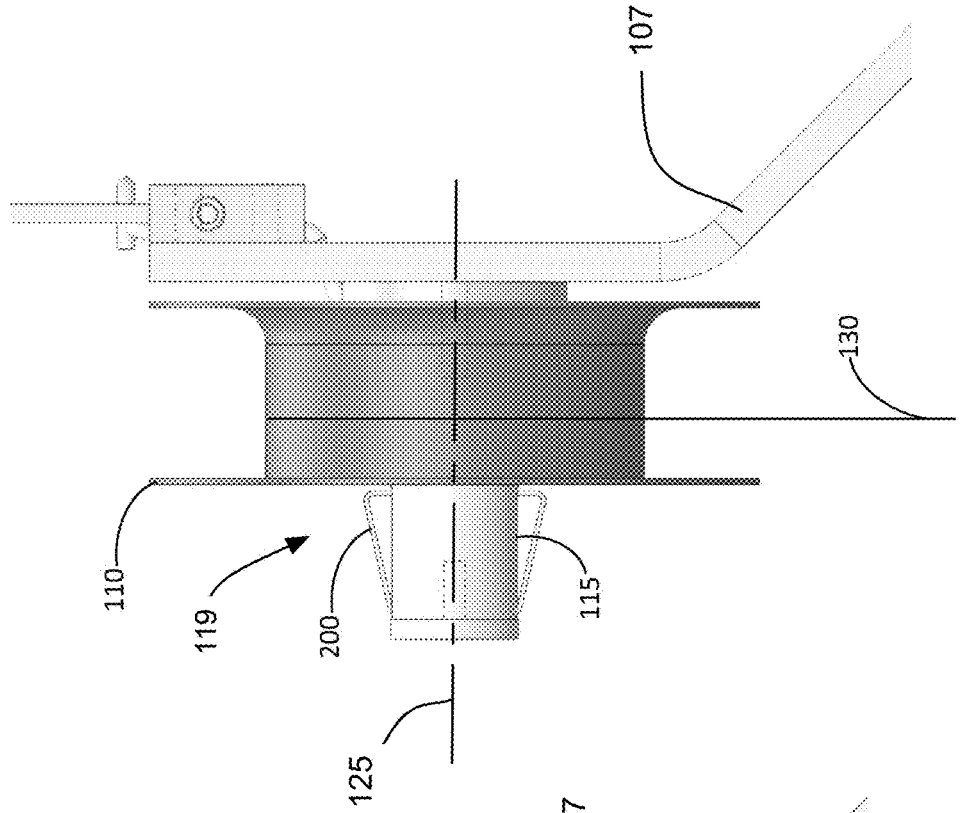
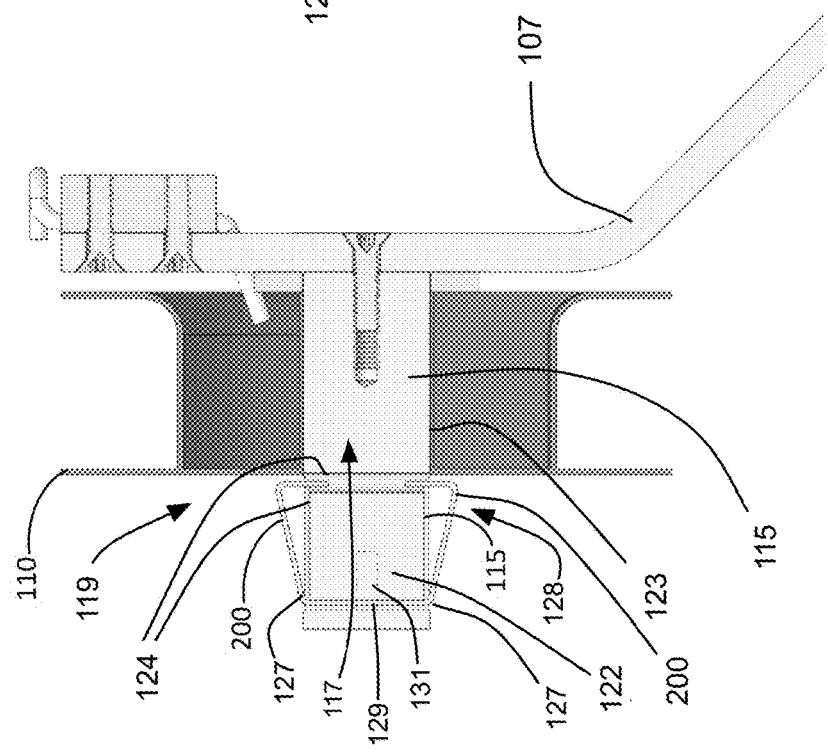

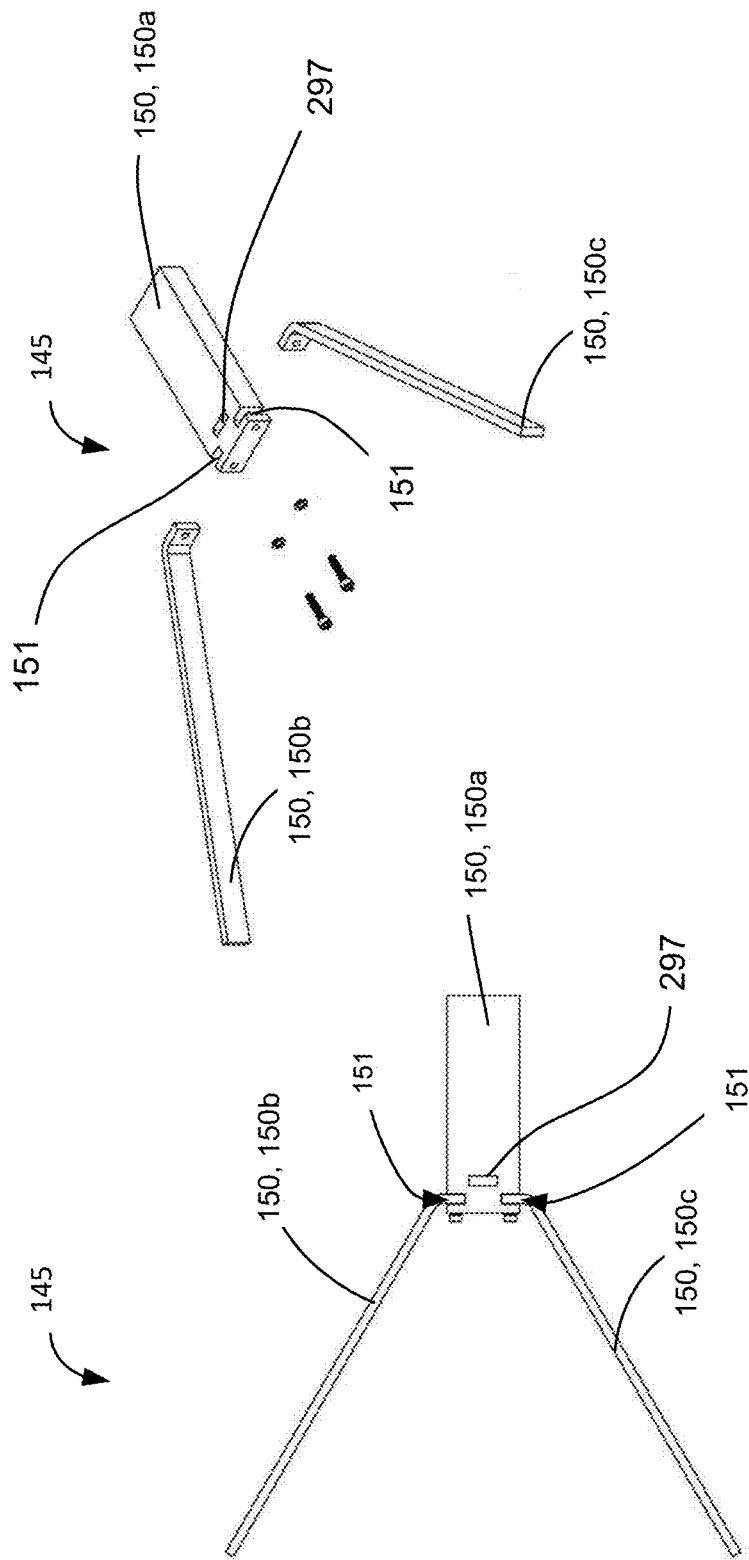

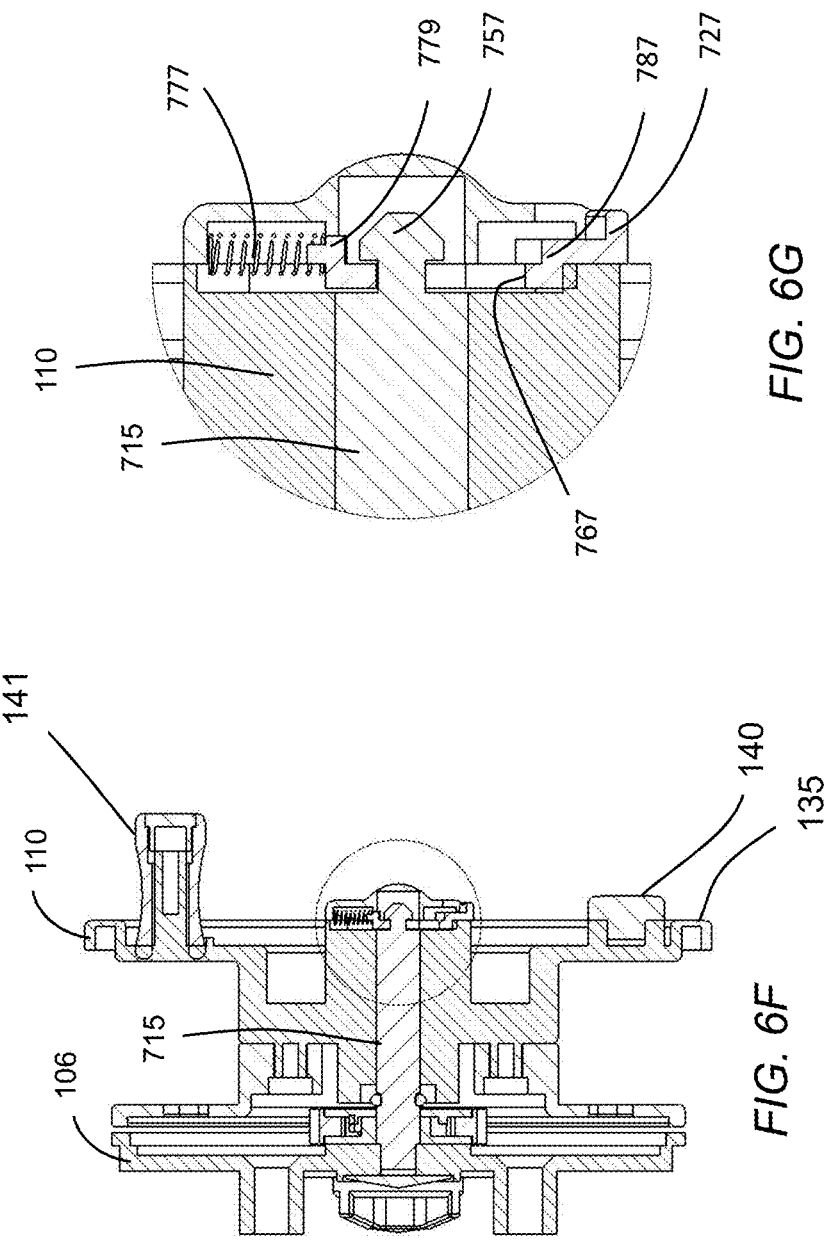

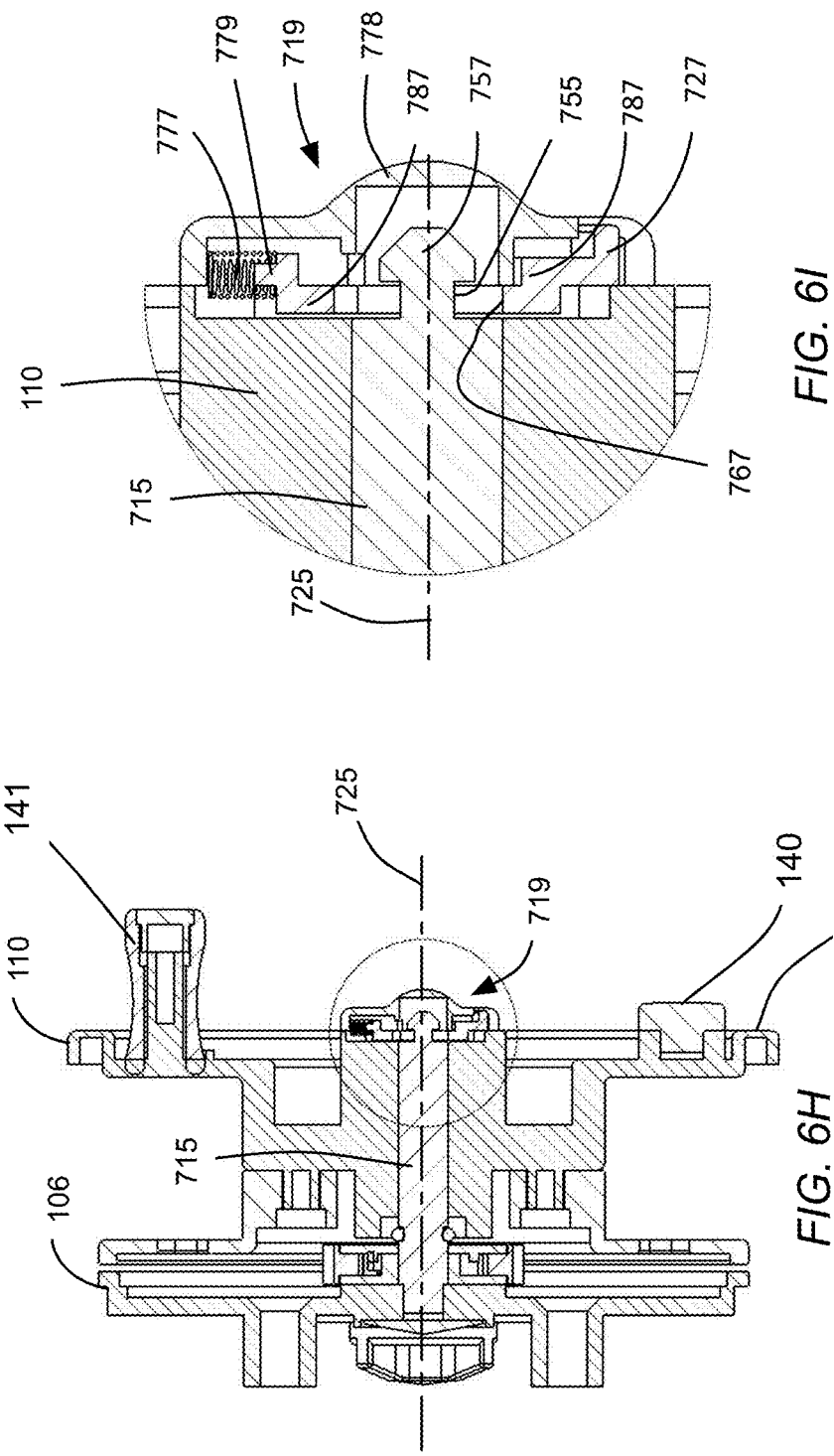

ICE FISHING STAND

FIELD OF THE DISCLOSURE

This disclosure generally relates to fishing stands for fishing apparatuses, and more particularly for fishing stands adapted for ice fishing.

BACKGROUND OF THE DISCLOSURE

Ice fishing stands are used to suspend a fishing line without the constant attention of an operator. Given the ability to leave a stand to operate independently, it is possible for the operator to attend to other tasks, which may include operating a number of other stands. Decreasing the amount of time and attention that an operator must give to a stand leads to greater efficiency for the operator.

In particular, for ice fishing, a tip up style of fishing apparatus may be used. When using a tip up, there are a number of situations in which the operator may wish to change out the fishing line being used. For example, if a line is fouled, if the operator wishes to change the species of fish being targeted, or for a variety of other reasons, the operator may wish to replace the fishing line with a new fishing line.

SUMMARY OF THE DISCLOSURE

Various embodiments of ice fishing stand are described herein.

According to a first set of embodiments, an ice fishing stand is disclosed and includes a spool, a base and a rotatable mounting arrangement. The spool has a spool axis and is configured to hold a fishing line during use. The rotatable mounting arrangement that rotatably connects said spool to said base for rotation about the spool axis. The spool is releasable from the base via a quick-release mechanism. During use, rotation of said spool about the spool axis pays out the fishing line in a direction that is substantially perpendicular to the spool axis, and is removable from said base by movement of the spool along said spool axis.

According to a second set of embodiments another ice fishing stand is disclosed and includes a base, a tip up arm, and a rod holder arm. The base is configured to be positioned about an ice-fishing hole, wherein the base has a receiving feature. The tip up arm is configured to hold a spool, and is releasably mountable to the receiving feature. The rod holder arm includes a rod holder that is configured to hold a fishing rod. The rod holder arm is releasably mountable to the receiving feature.

BRIEF DESCRIPTIONS OF THE DRAWINGS

Figure 1A:
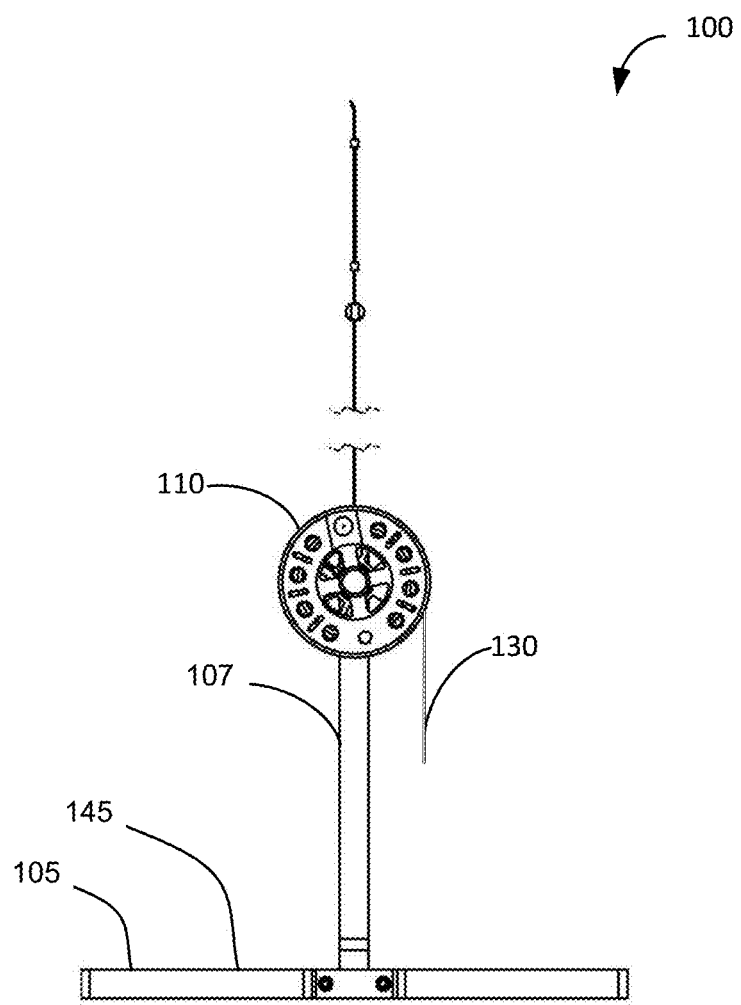
Figure 1B:
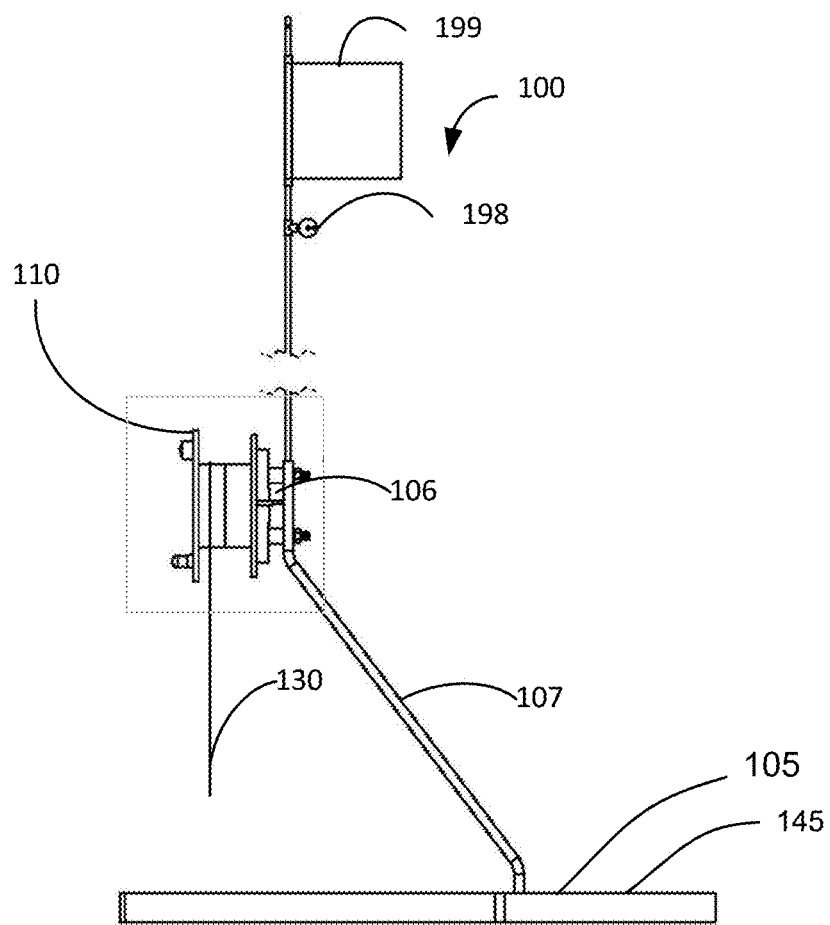
Figure 1C:
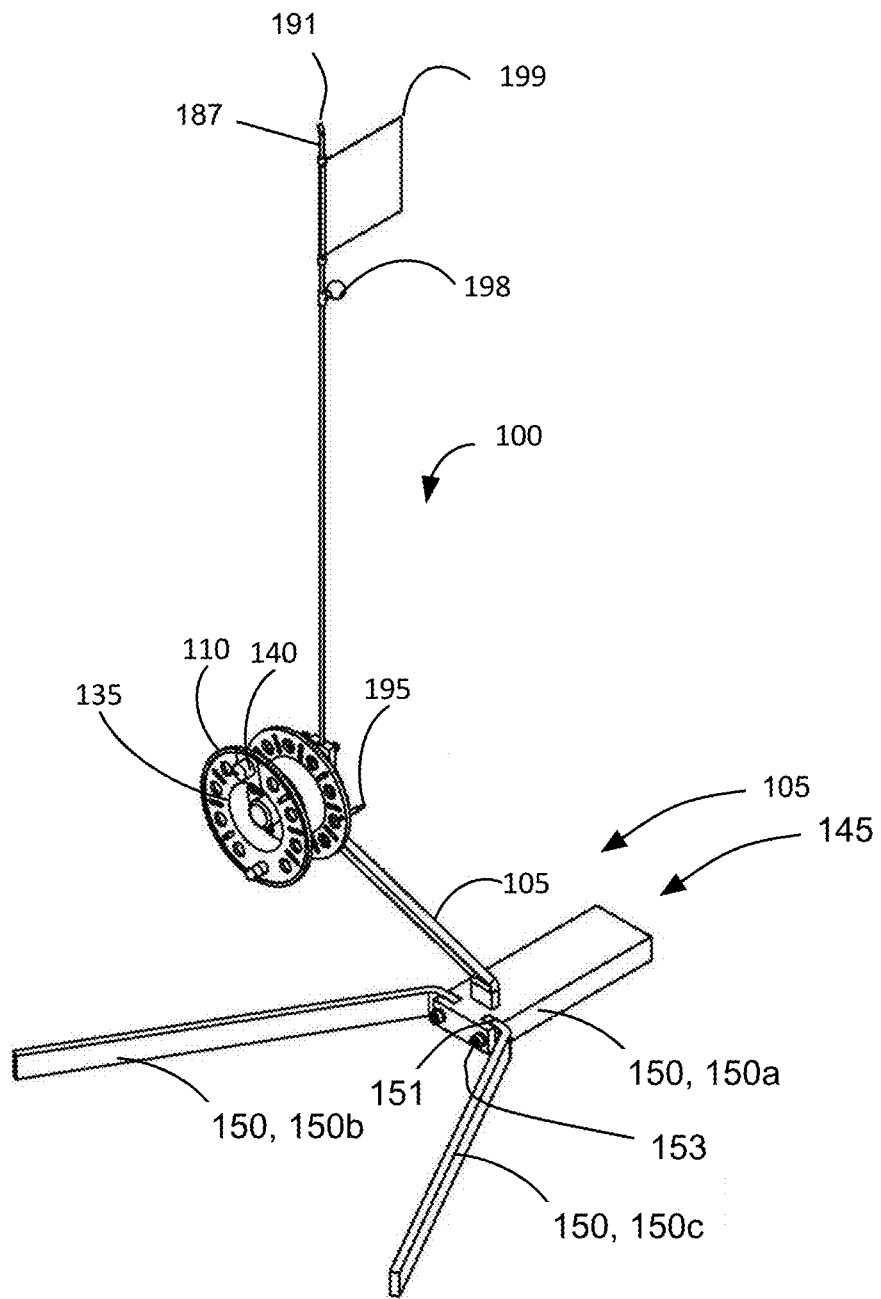
Figure 1D:
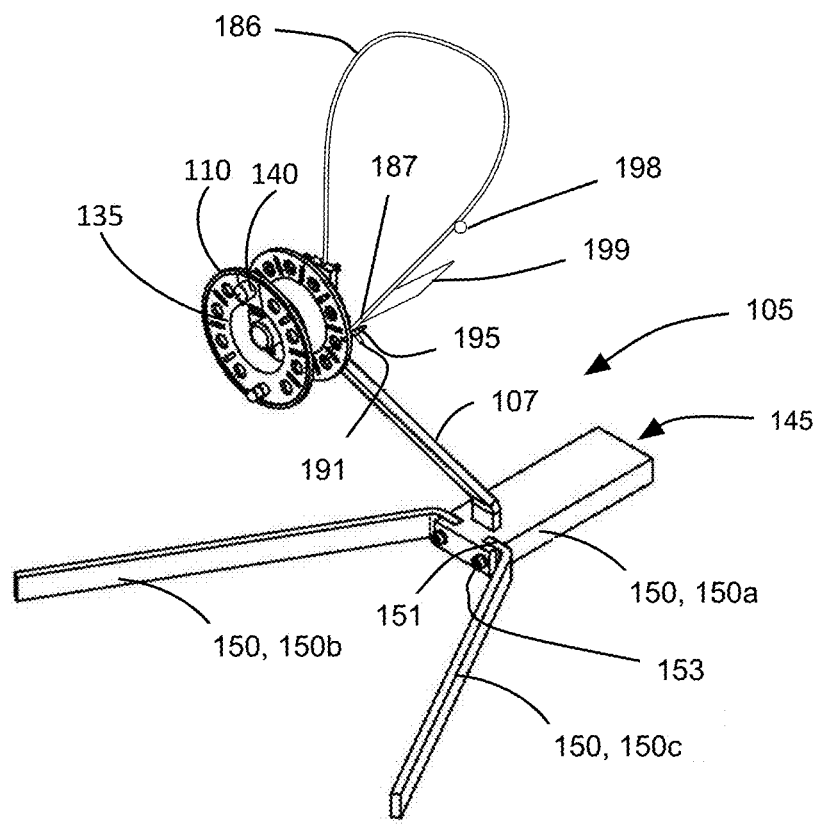
Figure 2A:
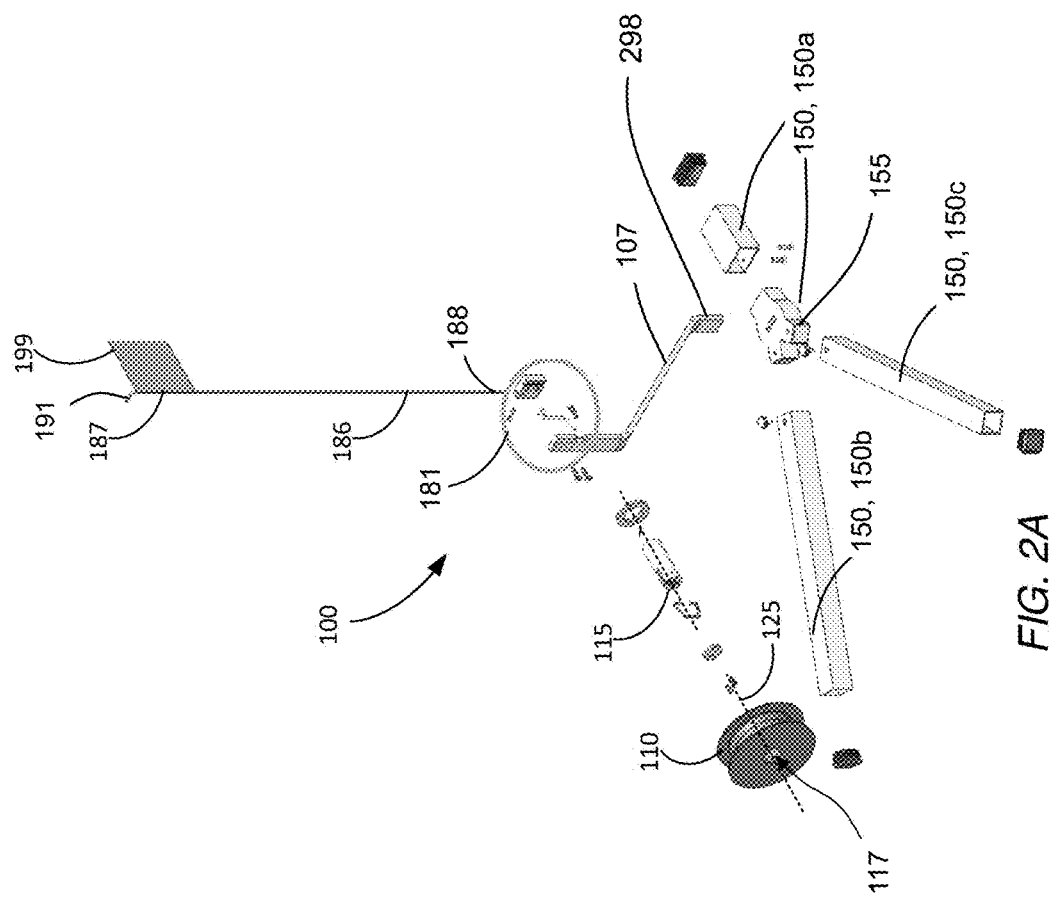
Figure 2D:
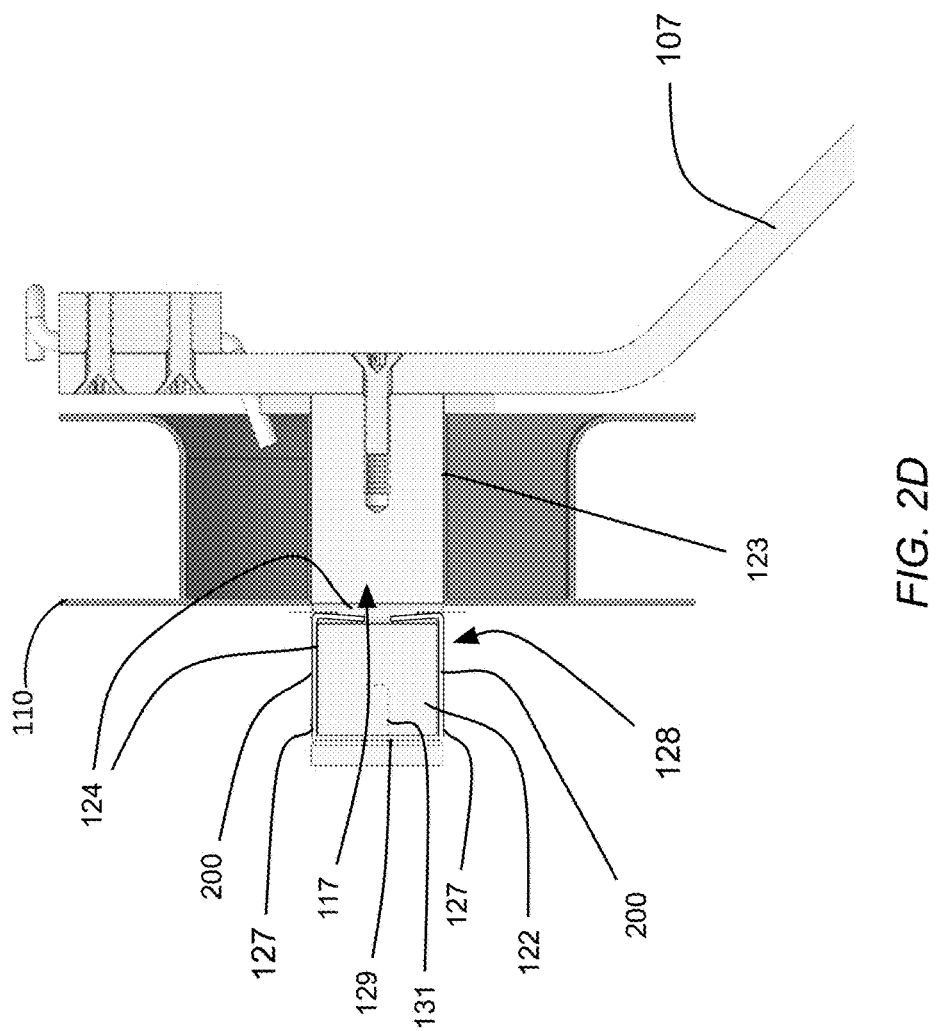
Figure 3:
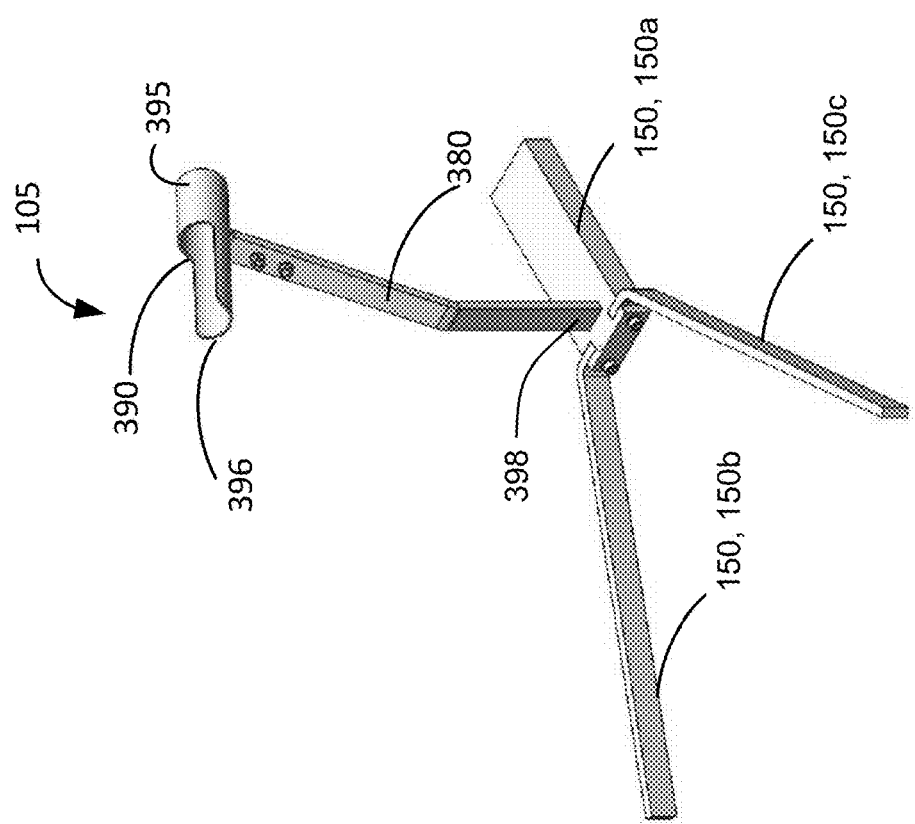
Figure 6A:
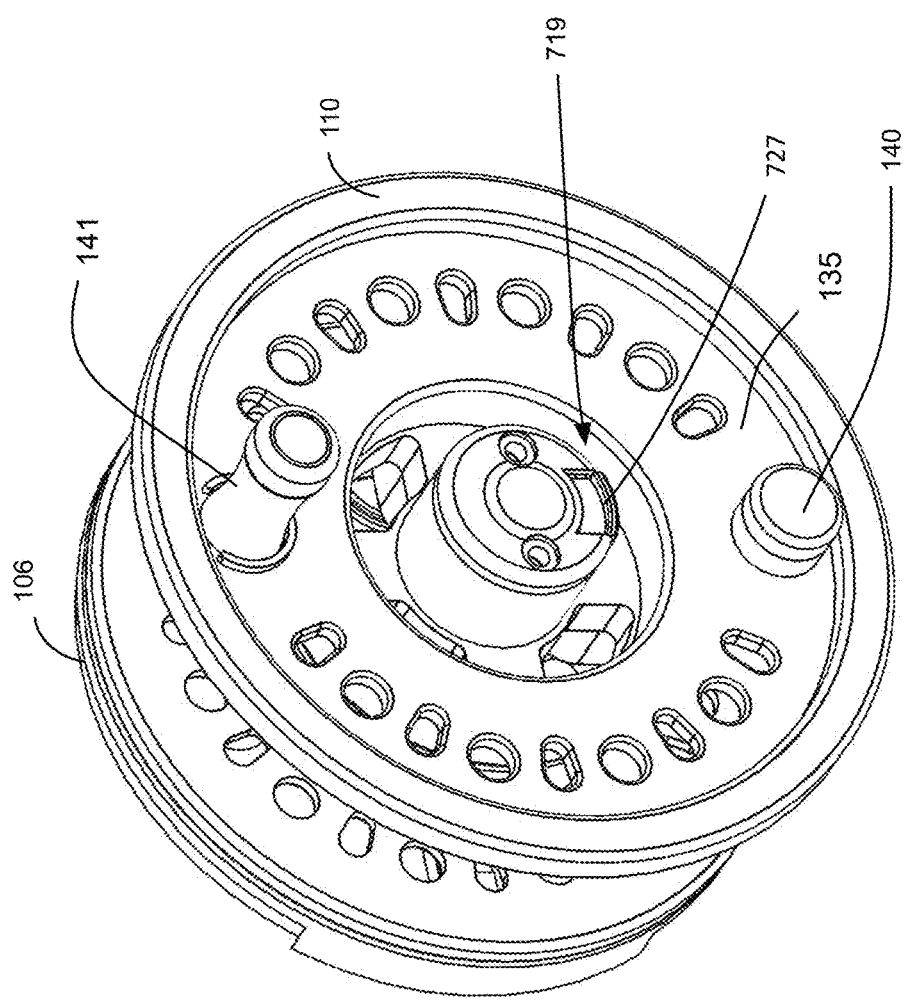
Figure 6B:
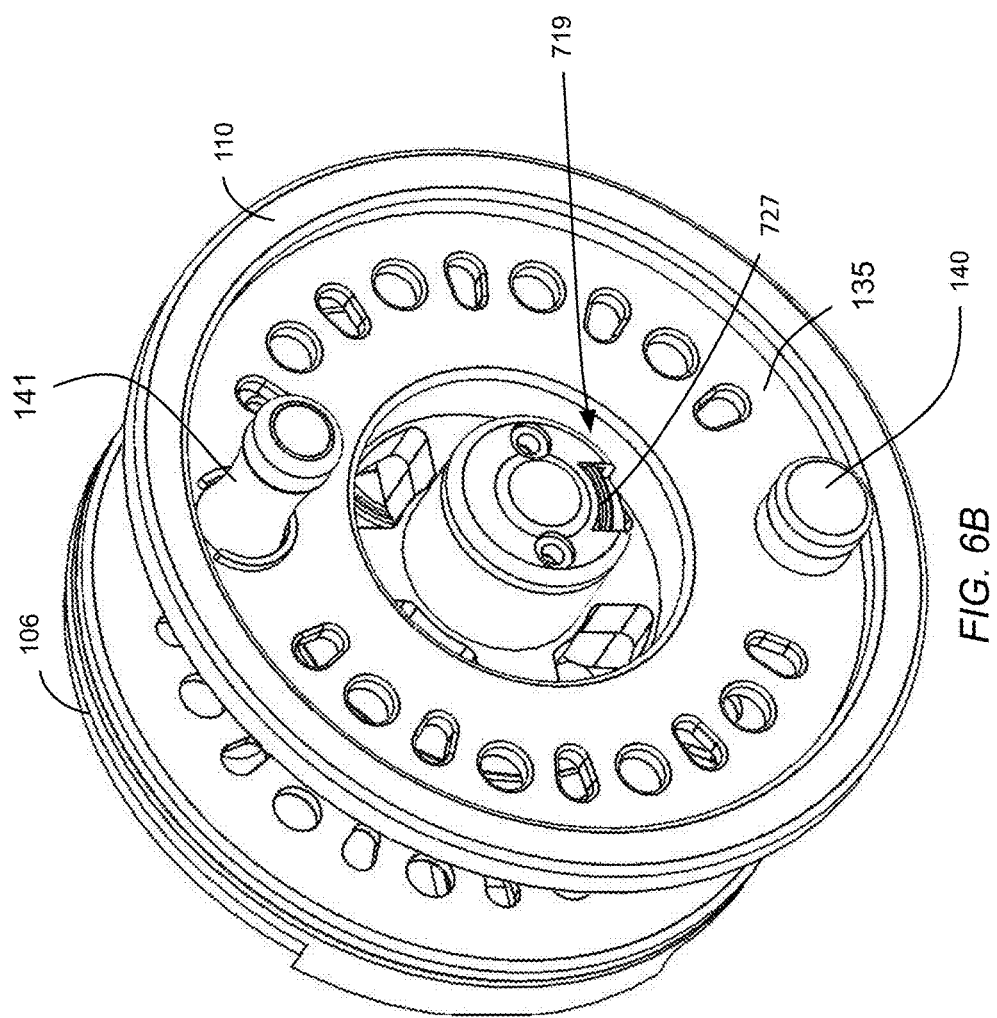
Figure 6C:
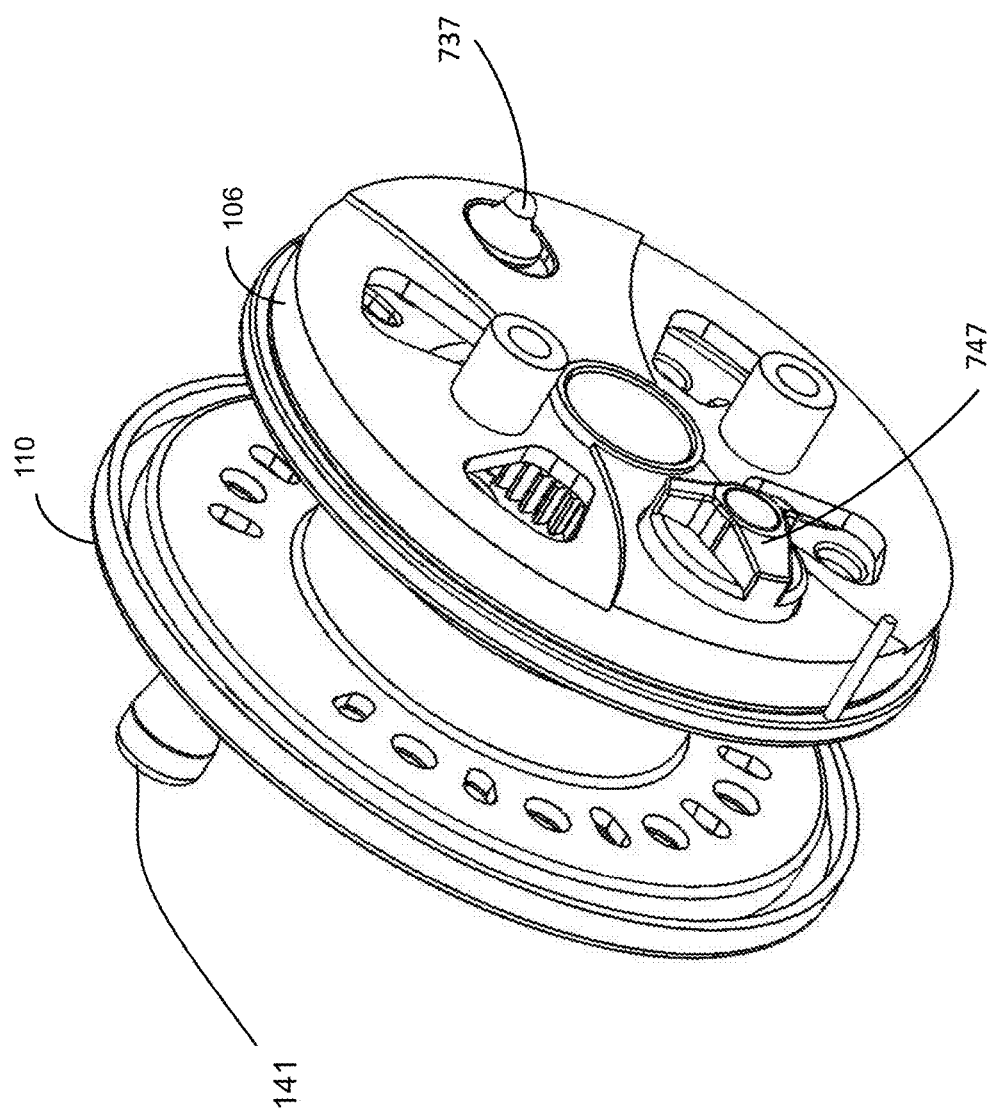
Figure 6D:
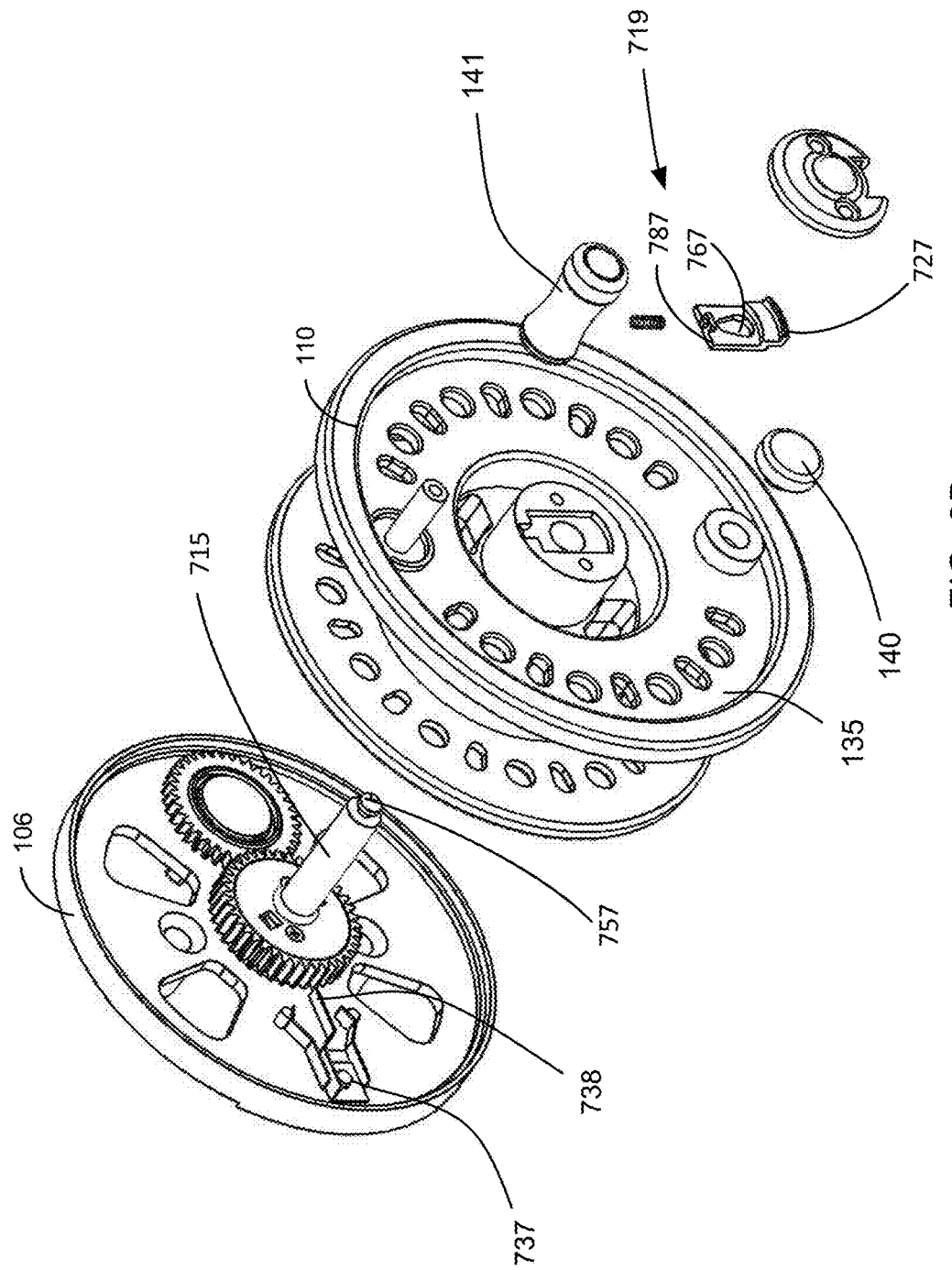
Figure 6E:
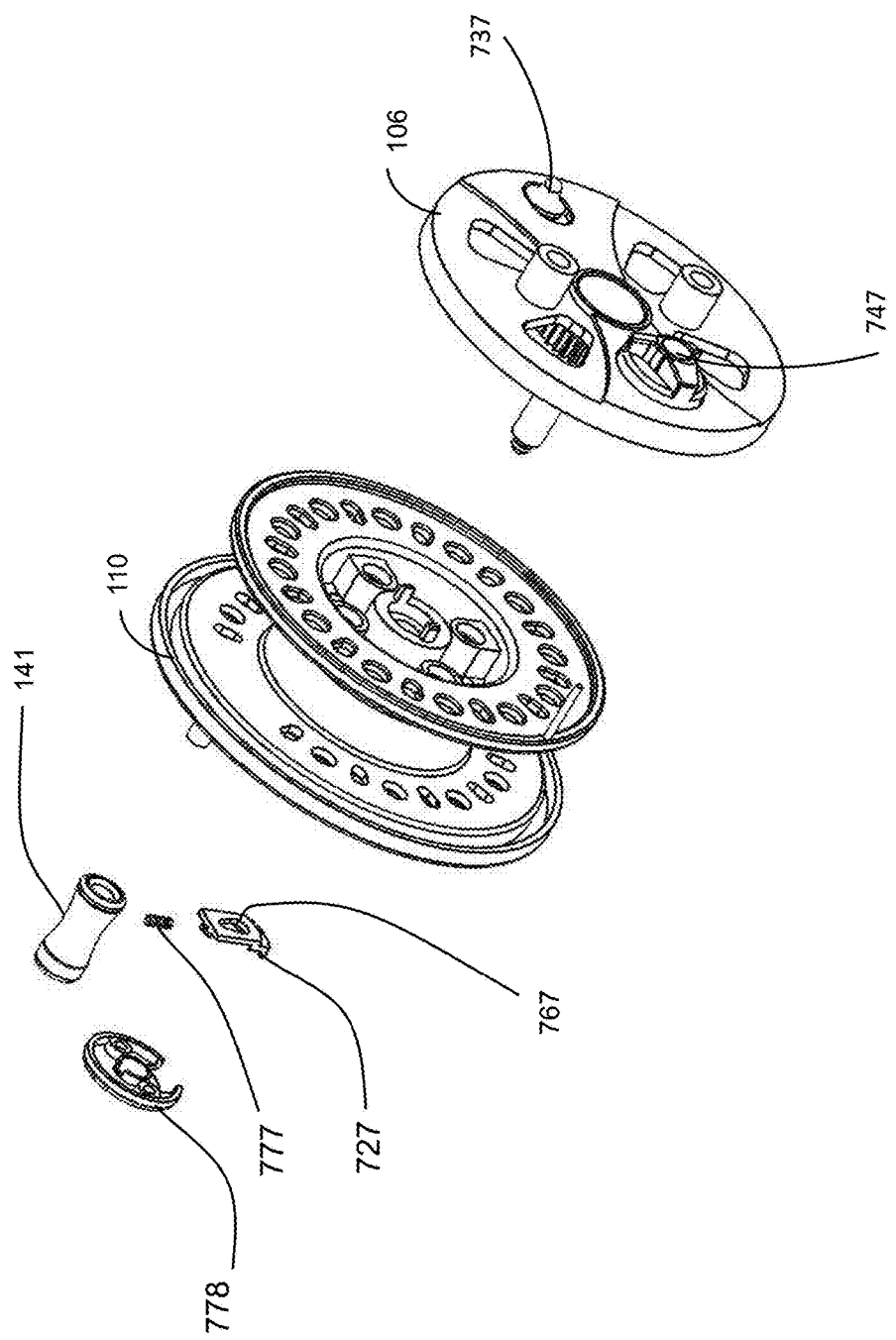
Figure 6J:
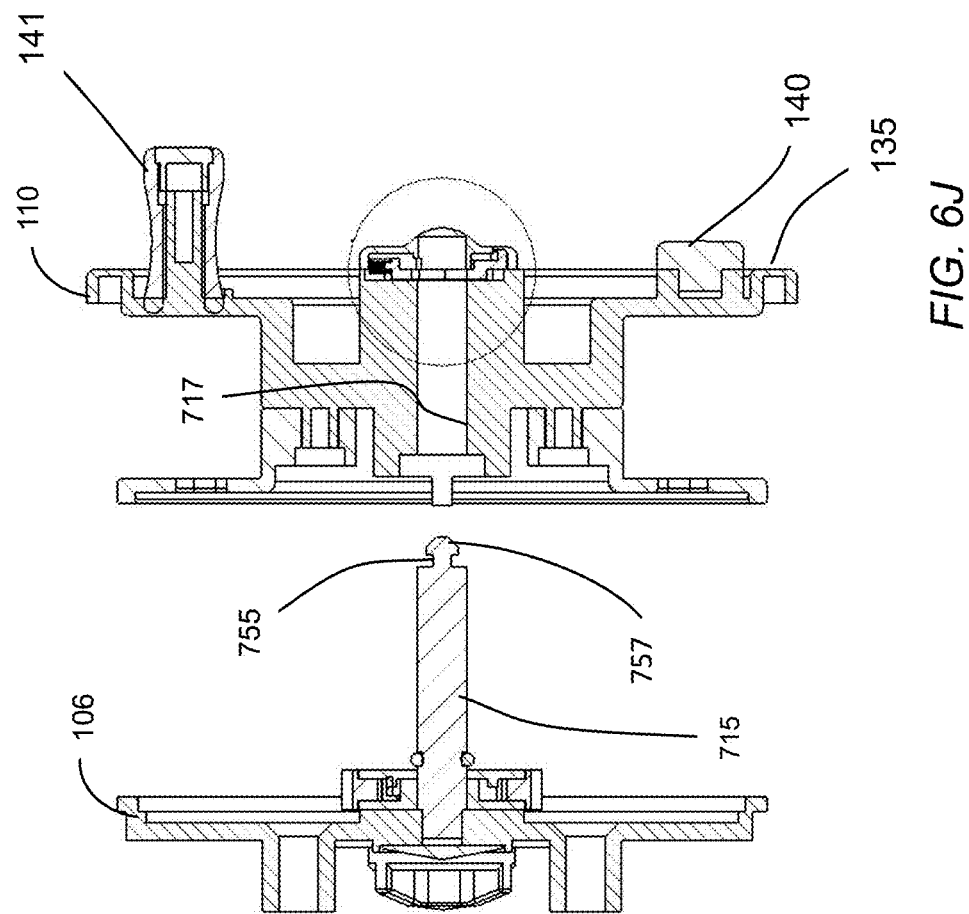
Figure 7A:
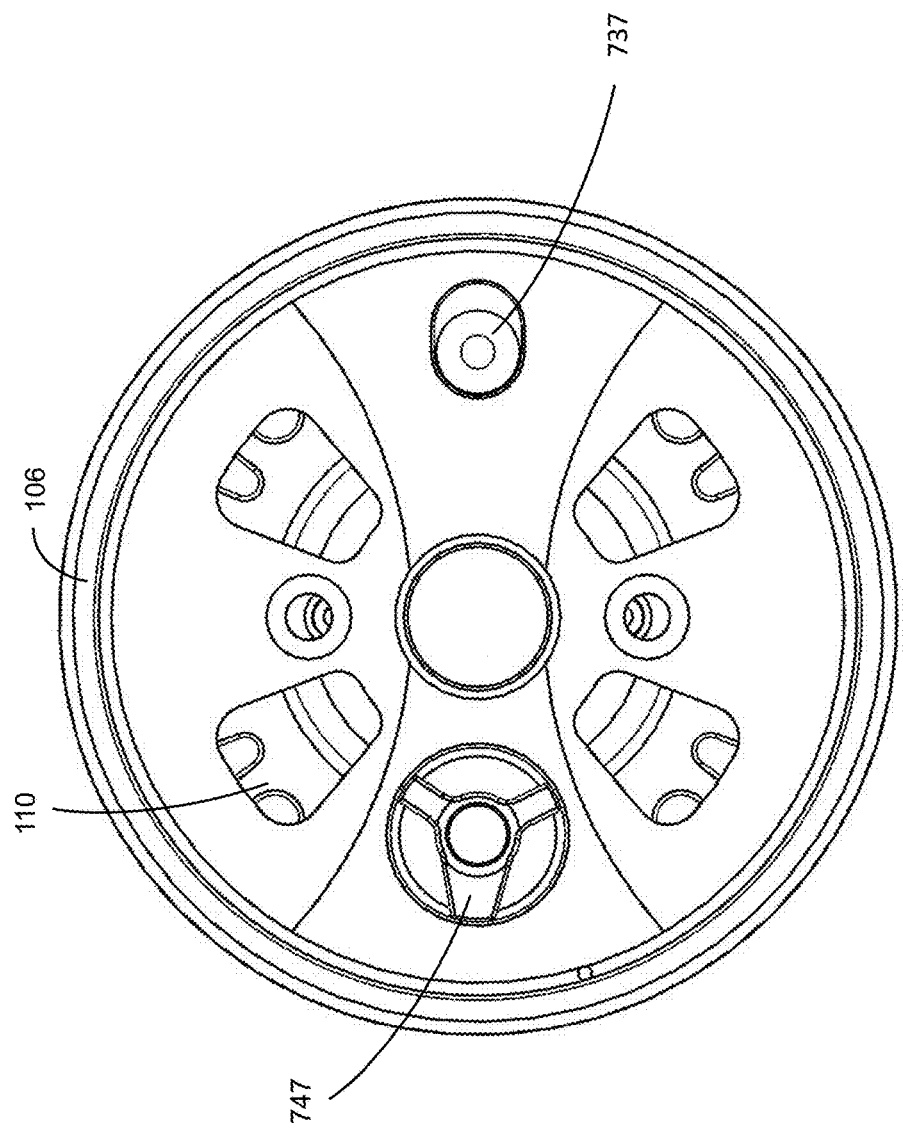
Figure 7B:
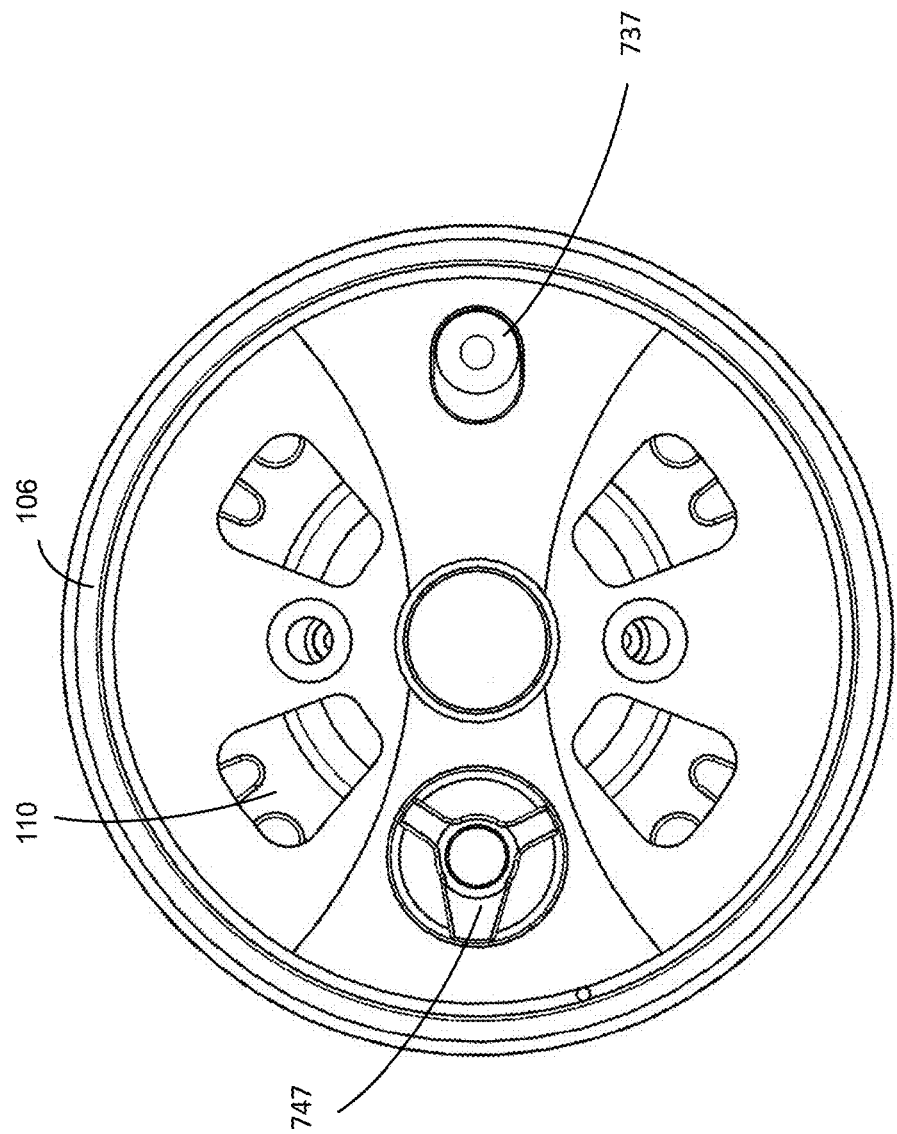
Figure 7C:
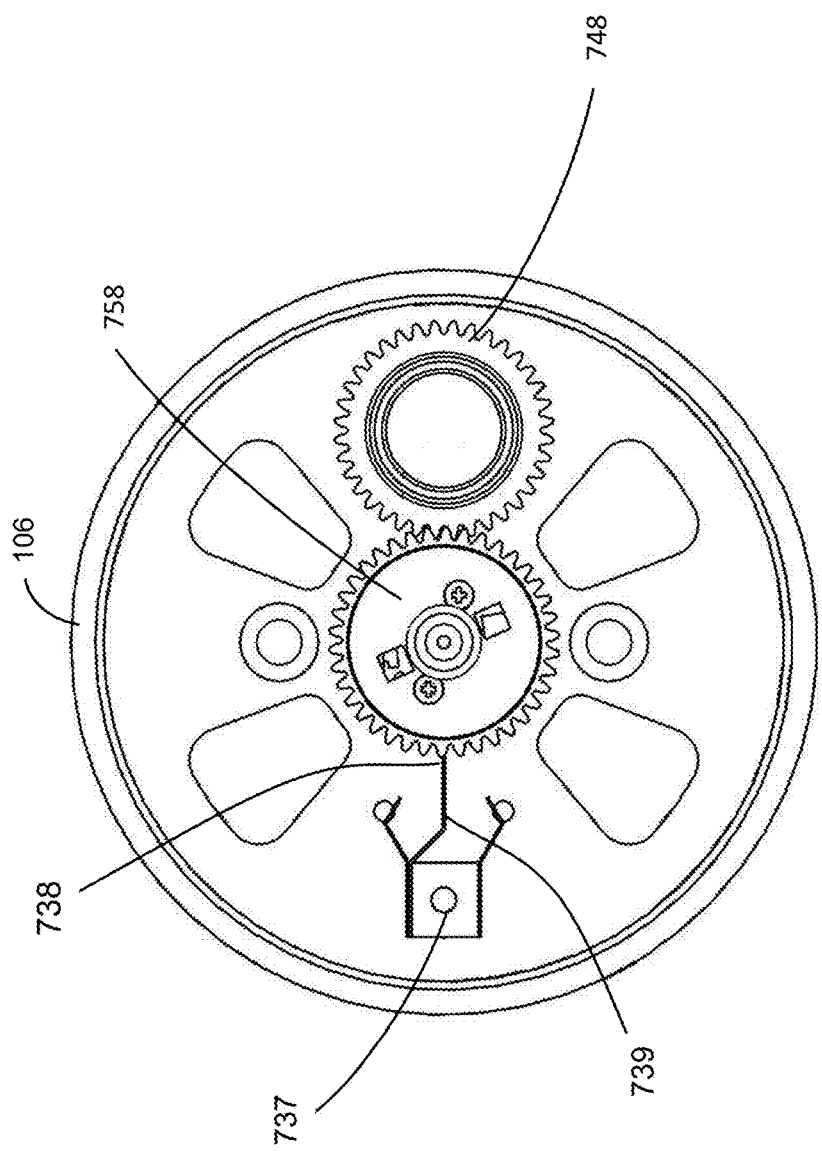
Figure 7D:
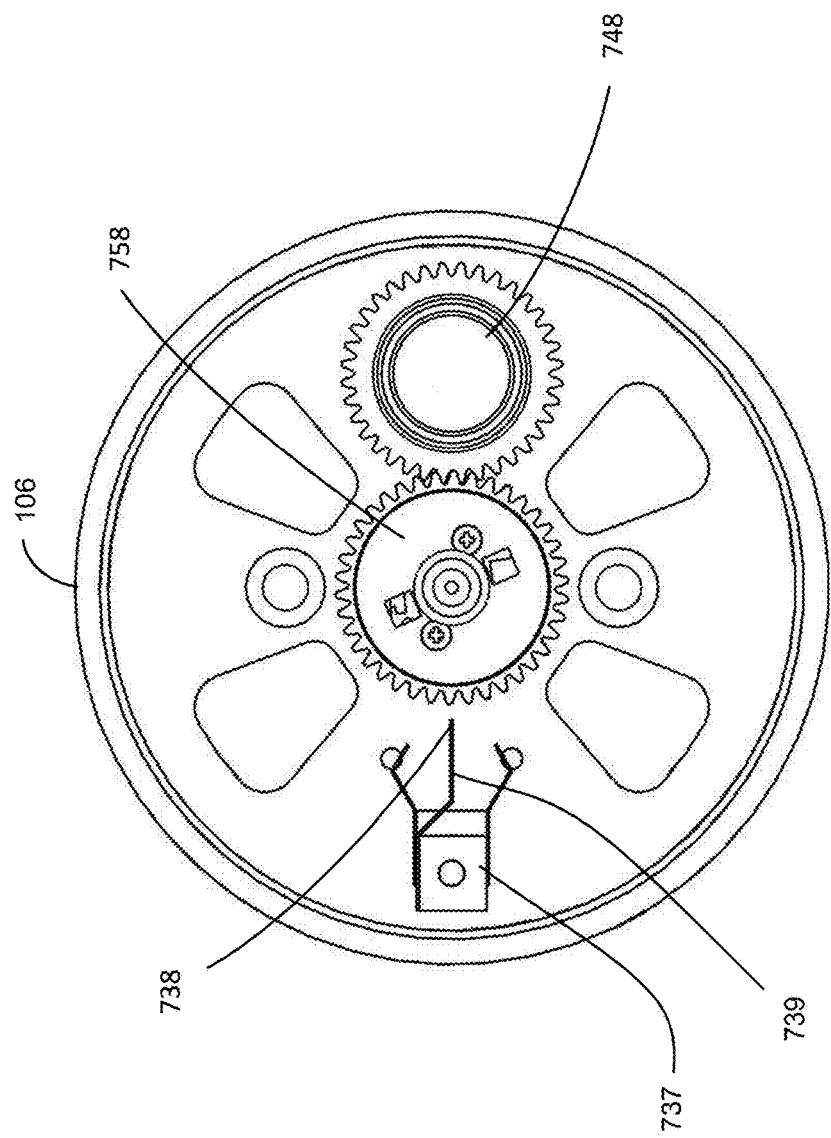

For a better understanding of the various embodiments described herein and to show more clearly how they may be carried into effect, reference will now be made, by way of example only, to the accompanying drawings in which:

FIG. 1A is a front elevation view of an ice fishing stand;
FIG. 1B is a side elevation view of the ice fishing stand shown in FIG. 1;
FIG. 1C is a perspective view of the ice fishing stand shown in FIG. 1 with a flag in an indicating position;
FIG. 1D is perspective view of the ice fishing stand shown in FIG. 1 with the flag in a set position;
FIG. 2A is an exploded perspective view of another ice fishing stand;
FIG. 2B is a sectional side view of a spool from the ice fishing stand shown in FIG. 2A, with a quick-release mechanism in an engagement position;
FIG. 2C is a side view of the spool shown in FIG. 2B;
FIG. 2D is a sectional side view of the spool shown in FIG. 2B, with the quick-release mechanism in a disengagement position;
FIG. 3 is a perspective view of a rod holder arm and base;
FIG. 4 is a top view of a base from the ice fishing stand shown in FIG. 1A;
FIG. 5 is an exploded perspective view of the base shown in FIG. 1A;
FIG. 6A is a front magnified perspective of the spool shown in FIG. 1A, with a quick-release mechanism in an engaged position;
FIG. 6B is a front magnified perspective of the spool shown in FIG. 1A, with a quick-release mechanism in a disengaged position;
FIG. 6C is a rear perspective of the spool shown in FIGS. 6A and 6B;
FIG. 6D is a front exploded perspective of the spool shown in FIGS. 6A and 6B;
FIG. 6E is a rear exploded perspective of the spool shown in FIGS. 6A and 6B;
FIG. 6F is a sectional side view of the spool shown in FIGS. 6A and 6B, showing the quick release mechanism in the engaged position;
FIG. 6G is a magnified sectional side view of a portion of the spool shown in FIGS. 6A and 6B, showing the quick release mechanism in the engaged position;
FIG. 6H is a sectional side view of the spool shown in FIGS. 6A and 6B, showing the quick release mechanism in the disengaged position;
FIG. 6I is a magnified sectional side view of a portion of the spool shown in FIGS. 6A and 6B, showing the quick release mechanism in the disengaged position;
FIG. 6J is an exploded sectional side view of the spool shown in FIGS. 6A and 6B, and a support shaft;
FIG. 7A is a rear elevation view of the spool shown in FIGS. 6A and 6B, with an adjustment member for a mechanical damper in an engaged position;
FIG. 7B is a rear elevation view of the spool shown in FIGS. 6A and 6B, with the adjustment member in a disengaged position;
FIG. 7C is a front elevation of the spool shown in FIGS. 6A and 6B, with the adjustment member in an engaged position; and
FIG. 7D is a front elevation of the spool shown in FIGS. 6A and 6B, with the adjustment member in a disengaged position.

DETAILED DESCRIPTION

FIGS. 1A-1D, and 2A-2D depict two examples of ice fishing stands 100 according to some embodiments. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the ice fishing stand 100 includes a base 105, a tip up arm 107 and a spool 110. The base 105 has a footing 145, which may be Y-shaped having first, send and third legs 150 (and shown at 150a, 150b and 150c individually in FIGS. 1C and 1D). The legs 150 are detachable from one another, which assists in reducing the size of any packaging that would be needed to hold the ice fishing stand 100 when disassembled.

According to some embodiments, and as seen in FIGS. 1A-1D and again as seen in FIGS. 4 and 5, the second and third legs 150b, and 150c are formed from bent metal rod and are each retained in a slot 151 in the first leg 150a via a fastener 153, whereas, according to the embodiment shown in FIGS. 2A-2D, the second and third legs 150b and 150c are formed from structural tubing and are each retained on a projection 155 extending from the first leg 150a.

A rotatable mounting arrangement rotatably connects said spool (110) to said base 105 for rotation about a spool axis 125. In the embodiments shown, the rotatable mounting arrangement includes a support shaft 115 that is positioned to pass through a shaft receiving aperture 117 (FIGS. 2A, 2B and 2D). The shaft 115 is associated with one of the base 105 and the spool 110 and the receiving aperture 117 is associated with the other of the base 105 and the spool 110. In the embodiment shown, the shaft 115 is associated with the base 105 and the receiving aperture 117 is associated with the spool 110. The support shaft 115 is associated with the base 105 in the sense that the shaft 115 is fixedly connected to a tip up arm 107 that is mounted to the base 105. As a result, the shaft 115 is stationary in the embodiment shown, and the receiving aperture 117 is provided on the spool 110 which rotates on the shaft 115.

The spool 110 is releasably retained relative to the base via a quick-release mechanism 119. The quick-release mechanism 119 is configured to permit the rapid, toolless retention and release of the spool 110 relative to the base 105. In the embodiment shown in FIGS. 2A-2D, the quick-release mechanism 119 includes a transverse abutment member 200 that is mounted to the free end (shown at 122) of the support shaft and that is positionable in a first position (FIG. 2B) in which the transverse abutment member 200 extends beyond an outer surface (shown at 123) of the support shaft 115 to prevent removal of the support shaft 115 from the shaft receiving aperture 117, and a second position (FIG. 2D) in which the transverse abutment member 200 does not extend beyond the outer surface 123 of the support shaft 115, such that the spool 110 is removable from the base 105 by movement of the spool 100 along the spool axis 125.

In the example shown there are two transverse abutment members 200 provided. However, it will be understood that any suitable number of abutment members 200 (e.g. one or more abutment members 200) could be used.

In the embodiment shown in FIGS. 2A-2D, in order for the abutment members 200 to not extend beyond the outer surface 123 of the support shaft 115 in the second position, the support shaft 115 has a channel 124 that is sized to receive the transverse abutment member 200 in said second position.

The quick-release mechanism 119 may further include a transverse abutment member biasing member 127 that is biased to urge the transverse abutment member 200 towards the first position (FIG. 2B). In the embodiment shown in FIGS. 2A-2D, the biasing member 127 is a corner portion of a contiguous strip of material 128, wherein the corner portion is between a mounting portion 129 and the transverse abutment member 200. The mounting portion 129 has an aperture therethrough, which receives a fastener 131 that mounts the strip of material 128 to the shaft 115. In embodiments wherein two abutment members 200 are provided (as shown in FIGS. 2A-2D), the strip 128 may further include a second biasing member 127 which is another corner portion between the mounting portion 129 and the second of the two abutment members 200.

Referring to FIGS. 6A-6J, an alternative quick-release mechanism, shown at 719, is provided. According to some alternatives, a radially-extending slot 755 is provided at a free end 757 of the support shaft (shown at 715). The support shaft 715 is received in a shaft-receiving aperture 717.

The quick-release mechanism 719 includes a transverse slider 787 that is connected to the spool 110 and that is slidable transversely (relative to the spool axis shown at 725) between a first position (FIGS. 6A, 6G) in which the transverse slider 787 extends into the radially-extending slot 755 to prevent removal of the spool 110 from the support shaft 715, and a second position (FIGS. 6B, 6I) in which the transverse slider 787 is outside of the radially-extending slot 755 to permit removal of the spool 110 from the support shaft 715. In the embodiment shown in FIGS. 6A-6J, the free end 757 of the support shaft 715 passes through a slider aperture 767 in the transverse slider 755. The material of the transverse slider 755 that defines a narrow end of the aperture 767 engages the radially extending slot 755 in the support shaft 715 in the first position. A wide end of the aperture 767 surrounds the free end 757 of the support shaft 715 and is outside of the slot 755 in the second position permitting removal of the spool 110.

The quick-release mechanism 719 may include a slider biasing member 777 that is biased to urge the transverse slider 787 towards the first position. A slider cap 778 is provided to slidably hold the slider 787 on the spool 715. The slider biasing member 777 may be any suitable type of biasing member such as a helical compression spring that extends between the slider cap 778 and a support projection 779 on the slider 787.

By providing a quick-release mechanism, such as either of the mechanisms 119 or 719, the replacement of the spool 110 is relatively easy and is fast, so as to permit a user to replace a first spool 110 with a second spool 110 for a number of possible reasons. For example, the user may wish to change to a second spool 110 that holds a fishing line that is of a different thickness than that which is held on the first spool 110, so as to permit the user to fish for a different type of fish.

According to some embodiments, a fishing line 130 is stored about the circumference of said generally cylindrical spool 110. As can be seen in FIG. 2C, during use, rotation of the spool 110 about the spool axis 125 pays out the fishing line in a direction that is substantially perpendicular to the spool axis 125.

According to some embodiments, a flag 186 (FIGS. 1C and 1D) is provided, and has a base end 188 that is connected to the tip up arm 107 (and is therefore indirectly connected to the base 105), and a free end 187 having a banner 199 and a hook 191. The flag 186 is positionable in an indicating position (FIG. 1C) in which the flag 186 indicates that the fishing line has been pulled, and a set position (FIG. 1D) in which the free end 187 (the hook 191 specifically) of the flag 186 is engaged with a flag retainer 195. The flag retainer 195, in the embodiment shown in FIG. 1D, is a projection that extends from the spool 110. If a fish pulls on the fishing line 130, it will cause the spool 110 to rotate, which will release the flag 186 from the flag retainer 195 (i.e. the rotation will bring the flag retainer 195 out of engagement with the hook 191 on the flag 186) to permit movement of the flag 186 to the indicating position. The flag 186 may be biased towards the indicating position (e.g. by having been made from any suitable resilient material such as a metal).

FIG. 2A illustrates another embodiment of a flag retainer shown at 181 which incorporates a pivoting member that is mounted to the tip up arm 107. Rotation of the spool 110 in this instance causes pivoting of the pivoting member, which in turn, would release the flag 186 to move to the indicating position (which the flag is already in, in FIG. 2A).

Optionally, the flag 186 may include a rattle 198 that provides an audio indication when a fish pulls the fishing line 130, in addition to the visual indication provided by the banner 199.

With references to FIGS. 6A-6J, in some embodiments the spool 110 may include a marker 140 on a free end face 135 of the spool 110 that is perpendicular to the spool axis 125. The marker 140 indicates the angular position of the spool 110. As a result, the user can look at the spool 110 and can see quickly how quickly the fishing line 130 is being paid out from the spool 110.

With references to FIGS. 6A-6J, in some embodiments the spool 110 may include a handle 141 that permits a user to turn the spool 110 as needed to rewind the fishing line 130 thereon. The handle 141 may extend from the free end face 135.

According to some embodiments and with reference to FIGS. 7A-7D, the ice fishing stand 100 may include a mechanical damper configured to apply a resistive torque to the spool 110. The resistive torque permits the spool 110 to have a selected resistance to rotation so that, in the event that an unexpected event, such as the lure (not shown) being knocked by a fish, causes the flag 186 to trip and move to the indicative position (such that it no longer engages the flag retainer 195), the fishing line 130 will not pay out simply due to the weight of the lure (not shown) that is mounted to the end of the fishing line 130. In the example embodiment shown in FIGS. 7A-7D, the mechanical damper includes a gear 758 and a tooth 738 that engages the gear 758. The gear 758 may be mounted to one of the spool 110 and the base 105, and the tooth 738 is mounted to the other of the spool 110 and the base 105. In the example shown in FIGS. 7C-7D, the gear 758 is mounted to the base 105 (indirectly via a support plate 106 that is mounted to the tip up arm 107 (not shown in FIGS. 7A-7D, but which is shown in FIGS. 1A-1D)) and is therefore stationary, while the tooth 738 is flexibly mounted to the spool 110, e.g. by means of a flexible resilient tooth arm 739. The arm 739 and tooth 738 may be made from any suitable material, such as, for example, a suitable metal.

The tooth 738 orbits about the gear 758 during rotation of the spool 110. As the spool 110 rotates, the tooth 738 is dragged into and out of each successively valley between adjacent gearteeth in the gear 758.

The tooth 738 is mounted to an adjustment member 737 that is positioned snuggly in a slotted aperture on the spool 110 so as to be movable radially relative to the spool 110 to move the tooth 738 between an engaged position (FIGS. 7A and 7C) in which a resistive torque is applied to the spool 110, and a disengaged position (FIGS. 7B and 7D) in which the mechanical damper does not apply a resistive torque to the spool 110. In addition to controlling the resistive torque by engagement of the tooth 738 and the gear 758, the amount of resistive torque may be further controlled by engaging a second gear 748 with the gear 758. In embodiments in which the second gear 748 is provided, the gear 758 may be referred to as the main gear 758. The second gear 748 may be rotatably secured to the spool 110 with a thumbscrew 747 or other suitable fastener so as to permit rotation of the second gear 748 about its own axis, which permits the second gear 748 to act as a planet gear and to orbit the main gear 758 by meshing with the toothed outer edge of the main gear 758.

According to still further embodiments, the tip up arm 107 may be removably connectable to the base 105. With reference to FIGS. 4 and 5, the base 105 may be provided with a receiving slot 297 configured to releasably receive an end (shown at 298 in FIGS. 1C and 1D) of the tip up arm 107. Additionally, the receiving slot 297 is configured to releasably receive an end 398 (FIG. 3) of a rod holder arm 380. The rod holder arm 380 has a rod holder 390 connected thereto. The rod holder 390, in some embodiments, may include a cylindrical portion 395 for accommodating the end of a fishing rod and a semi-cylindrical portion 396 for accommodating the portion of a fishing rod that holds a fishing reel.

Although various ice fishing stands 100 have been described as above, it is understood that for the purpose of this disclosure, language of "at least one of X, Y, and Z" and "one or more of X, Y and Z" can be construed as X only, Y only, Z only, or any combination of two or more items X, Y, and Z (e.g., XYZ, XYY, YZ, ZZ).

It is also understood that the terms "couple", "coupled", "connect", "connected" are not limited to direct contact between the described components, but also contemplate indirect contact (i.e. the use of intermediate components to achieve the connection or coupling).

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a", "an" and "the" are intended to not preclude the possibility of having a plurality, unless the context clearly indicates otherwise.

The invention claimed is:
1. An ice fishing, comprising:
a spool, said spool having a spool axis and configured to hold a fishing line during use;
a base; and
a rotatable mounting arrangement that rotatably connects said spool to said base for rotation about the spool axis, wherein said spool is releasably retained relative to the base via a quick-release mechanism and, during use, rotation of said spool about the spool axis pays out the fishing line in a direction that is substantially perpen- dicular to the spool axis, and is removable from said base by movement of the spool along said spool axis, wherein the rotatable mounting arrangement includes a support shaft associated with one of the base and the spool, that is positioned to pass through a shaft receiving aperture that is associated with the other of the base and the spool, wherein the support shaft has a free end and a radially-extending slot proximate the free end, wherein the quick-release mechanism includes a transverse slider that is connected to the spool and that is slidable transversely to the spool axis between a first position in which the transverse slider extends into the radially-extending slot to block removal of the spool from the support shaft, and a second position in which the transverse slider is outside of the radially-extending slot to permit removal of the spool from the support shaft.

2. The ice fishing stand of claim 1, wherein said quick-release mechanism includes a slider biasing member that is biased to urge the transverse slider towards said first position.

3. The ice fishing stand of claim 1, wherein said spool includes a marker positioned to indicate an angular position of the spool.

4. The ice fishing stand of claim 1, wherein said base further comprises a Y-shaped footing.

5. The ice fishing stand of claim 4, wherein the Y-shaped footing includes first, second and third legs that are detachable from one another.

6. The ice fishing stand of claim 1, further comprising a mechanical damper configured to resist rotation of said spool about said spool axis.

7. The ice fishing stand of claim 6, wherein said mechanical damper includes a gear mounted to one of the spool and the base, and a tooth that is engageable with said gear, wherein one of the tooth and the gear is rotatable about the other of the tooth and the gear during rotation of the spool, such that the tooth is resiliently dragged along successive gearteeth on the gear.

8. The ice fishing stand of claim 7, wherein said tooth is adjustable in position so as to control a depth of engagement between said tooth and said gear.

9. The ice fishing stand of claim 1, further comprising a flag that has a base end that is connected to the base, and a free end, wherein the flag is positionable in an indicating position in which the flag indicates that the fishing line has been pulled, and a set position in which the free end of the flag is engaged with a flag retainer, wherein the flag is biased towards the indicating position, wherein rotation of the spool releases the flag from the flag retainer to permit movement of the flag to the indicating position.

10. An ice fishing, comprising:
a spool, said spool having a spool axis and configured to hold a fishing line during use;
a base; and
a rotatable mounting arrangement that rotatably connects said spool to said base for rotation about the spool axis,
wherein said spool is releasably retained relative to the base via a quick-release mechanism and, during use, rotation of said spool about the spool axis pays out the fishing line in a direction that is substantially perpendicular to the spool axis, and is removable from said base by movement of the spool along said spool axis,
wherein the rotatable mounting arrangement includes a support shaft associated with one of the base and the spool, that is positioned to pass through a shaft receiving aperture associated with the other of the base and the spool, wherein the support shaft has a free end and a radially-extending slot proximate the free end,
wherein said quick-release mechanism includes a transverse abutment member that is mounted to the free end of the support shaft and that is positionable in a first position in which the transverse abutment member extends transversely relative to the spool axis beyond an outer surface of the support shaft to prevent removal of the support shaft from the shaft receiving aperture, and a second, collapsed position in which the transverse abutment member remains mounted to the free end of the support shaft but does not extend transversely relative to the axis beyond the outer surface of the support shaft.

11. The ice fishing stand of claim 10, wherein said support shaft has a channel that receives said transverse abutment member in said second position.

12. The ice fishing stand of claim 11, wherein the quick-release mechanism further includes a transverse abutment member biasing member that is biased to urge the transverse abutment member towards the first position.

13. An ice fishing stand, comprising:
a spool, said spool having a spool axis and configured to hold a fishing line during use;
a base; and
a rotatable mounting arrangement that rotatably connects said spool to said base for rotation about the spool axis,
wherein said spool is releasably retained relative to the base via a quick-release mechanism and, during use, rotation of said spool about the spool axis pays out the fishing line in a direction that is substantially perpendicular to the spool axis, and is removable from said base by movement of the spool along said spool axis,
a damper assembly including a gear mounted to one of the spool and the base, and a tooth that is engageable with said gear, wherein only one of the tooth and the gear is rotatable about the other of the tooth and the gear during rotation of the spool, such that the tooth is resiliently dragged along successive gearteeth on the gear.

* * * * *

UNITED STATES PATENT AND TRADEMARK OFFICE
CERTIFICATE OF CORRECTION

PATENT NO. : 10,034,467 B2
APPLICATION NO. : 14/849170
DATED : July 31, 2018
INVENTOR(S) : Volodymyr Zvezdonkin It is certified that error appears in the above-identified patent and that said Letters Patent is hereby corrected as shown below:

In the Claims

Please replace Claim 1 with the corrected Claim 1 below:
1. An ice fishing stand, comprising:
 a spool, said spool having a spool axis and configured to hold a fishing line during use;
 a base; and
 a rotatable mounting arrangement that rotatably connects said spool to said base for rotation about the spool axis,
 wherein said spool is releasably retained relative to the base via a quick-release mechanism and, during use, rotation of said spool about the spool axis pays out the fishing line in a direction that is substantially perpendicular to the spool axis, and is removable from said base by movement of the spool along said spool axis,
 wherein the rotatable mounting arrangement includes a support shaft associated with one of the base and the spool, that is positioned to pass through a shaft receiving aperture that is associated with the other of the base and the spool, wherein the support shaft has a free end and a radially-extending slot proximate the free end,
 wherein the quick-release mechanism includes a transverse slider that is connected to the spool and that is slidable transversely to the spool axis between a first position in which the transverse slider extends into the radially-extending slot to block removal of the spool from the support shaft, and a second position in which the transverse slider is outside of the radially-extending slot to permit removal of the spool from the support shaft.

Please replace Claim 10 with the corrected Claim 10 below:
10. An ice fishing stand, comprising:
 a spool, said spool having a spool axis and configured to hold a fishing line during use;
 a base; and
 a rotatable mounting arrangement that rotatably connects said spool to said base for rotation about the spool axis, Signed and Sealed this
Second Day of October, 2018

Andrei Iancu
*Director of the United States Patent and Trademark Office* wherein said spool is releasably retained relative to the base via a quick-release mechanism and, during use, rotation of said spool about the spool axis pays out the fishing line in a direction that is substantially perpendicular to the spool axis, and is removable from said base by movement of the spool along said spool axis, wherein the rotatable mounting arrangement includes a support shaft associated with one of the base and the spool, that is positioned to pass through a shaft receiving aperture associated with the other of the base and the spool, wherein the support shaft has a free end and a radially-extending slot proximate the free end, wherein said quick-release mechanism includes a transverse abutment member that is mounted to the free end of the support shaft and that is positionable in a first position in which the transverse abutment member extends transversely relative to the spool axis beyond an outer surface of the support shaft to prevent removal of the support shaft from the shaft receiving aperture, and a second, collapsed position in which the transverse abutment member remains mounted to the free end of the support shaft but does not extend transversely relative to the axis beyond the outer surface of the support shaft.